US006577339B1

(12) United States Patent
Thompson et al.

(10) Patent No.: US 6,577,339 B1
(45) Date of Patent: Jun. 10, 2003

(54) AIRCRAFT MONITORING AND ANALYSIS SYSTEM AND METHOD

(75) Inventors: Robert Lee Thompson, Rogers, AR (US); Dennis C. Leiner, Greenfield, NH (US)

(73) Assignee: Pinotage, LLC, Fayetteville, AR (US)

( * ) Notice: Subject to any disclaimer, the term of this patent is extended or adjusted under 35 U.S.C. 154(b) by 0 days.

(21) Appl. No.: 09/126,368

(22) Filed: Jul. 30, 1998

Related U.S. Application Data

(60) Provisional application No. 60/054,198, filed on Jul. 30, 1997, and provisional application No. 60/054,197, filed on Jul. 30, 1997.

(51) Int. Cl.⁷ .................. H04N 5/232; H04N 5/225; H04N 7/18
(52) U.S. Cl. .................. 348/211.14; 348/65; 348/117; 348/151; 348/159; 348/374; 348/375; 340/540; 340/963; 701/14
(58) Field of Search .................. 348/36, 39, 46–48, 348/61, 65, 71–76, 113, 117, 135, 142, 143, 152, 153, 159, 169, 207, 222, 335, 340, 373, 374, 375; 340/540, 945, 963; 701/3, 8, 9, 10, 14

(56) References Cited

U.S. PATENT DOCUMENTS

| 3,917,199 A | * | 11/1975 | Dewitt | 396/13 |
|---|---|---|---|---|
| 4,621,284 A | | 11/1986 | Nishioka et al. | 348/69 |
| 4,644,845 A | | 2/1987 | Garehime, Jr. | 89/41.05 |
| 4,674,844 A | | 6/1987 | Nishioka et al. | 359/792 |
| 4,697,210 A | | 9/1987 | Toyota et al. | 348/71 |
| 4,745,471 A | | 5/1988 | Takamura et al. | 348/76 |
| 4,807,025 A | | 2/1989 | Eino et al. | 348/72 |
| 4,809,680 A | | 3/1989 | Yabe | 600/130 |
| 4,816,828 A | * | 3/1989 | Feher | 348/117 |
| 4,831,456 A | | 5/1989 | Takamura | 348/374 |
| 4,832,003 A | | 5/1989 | Yabe | 600/109 |
| 4,855,838 A | * | 8/1989 | Jones | 348/84 |
| 4,858,002 A | | 8/1989 | Zobel | 348/65jf124c |

FOREIGN PATENT DOCUMENTS

| DE | 196 33 286 A | 2/1998 | |
|---|---|---|---|
| EP | 0 581 286 A1 | 7/1993 | |
| JP | 61 006 984 A | 1/1986 | H04N/5/225 |
| JP | 63 287 176 A | 11/1988 | H04N/5/232 |
| WO | WO 97/11634 A | 4/1997 | A61B/1/04 |

OTHER PUBLICATIONS

International Search Report issued from International Application No.: PCT/US98/15686, mailed on Nov. 18, 1998.

International Search Report issued from International Application No.: PCT/US98/15686, mailed Jan. 25, 1999.

*Primary Examiner*—Ngoc-Yen Vu
(74) *Attorney, Agent, or Firm*—Wolf, Greenfield & Sacks, P.C.

(57) ABSTRACT

A camera that includes a camera head, an amplifier, and a camera control unit. The camera head includes a charge coupled device and at least one lens that is optically coupled to the charge coupled device to focus light energy onto the charge coupled device. The charge coupled device provides a plurality of signals indicative of the light energy incident upon a plurality of regions of the charge coupled device. The amplifier is electrically coupled to the charge coupled device to receive the plurality of signals from the charge coupled device and provide a plurality of amplified signals to the camera control unit, but, the amplifier is physically separated from the charge coupled device so that the amplifier is outside the camera head. The camera control unit is electrically coupled to the amplifier to receive the plurality of amplified signals from the amplifier and to process the plurality of amplified signals to form an image. In one embodiment, the camera head can move in numerous directions relative to other portions of the camera system, including rotationally, pivotally, and towards and away from a body of the camera.

69 Claims, 10 Drawing Sheets

U.S. PATENT DOCUMENTS

| | | | |
|---|---|---|---|
| 4,867,137 A | 9/1989 | Takahashi | 600/109 |
| 4,868,647 A | 9/1989 | Uehara et al. | 348/65 |
| 4,870,488 A | 9/1989 | Ikuno et al. | 348/45 |
| 4,878,112 A | 10/1989 | Ieoka | 348/70 |
| 4,878,113 A | 10/1989 | Nakamura | 348/71 |
| 4,888,639 A | 12/1989 | Yabe et al. | 348/69 |
| 4,890,159 A | 12/1989 | Ogiu | 348/72 |
| 4,971,035 A | 11/1990 | Ito | 600/129 |
| 4,989,586 A | 2/1991 | Furukawa | 600/110 |
| 5,016,098 A | 5/1991 | Cooper et al. | 348/66 |
| 5,021,888 A | 6/1991 | Kondou et al. | 348/76 |
| 5,051,824 A | 9/1991 | Nishigaki | 348/68 |
| 5,111,288 A | 5/1992 | Blackshear | 348/143 |
| 5,144,661 A * | 9/1992 | Shamosh | 340/540 |
| 5,172,225 A | 12/1992 | Takahashi | 348/74 |
| 5,198,931 A | 3/1993 | Igarashi | 359/660 |
| 5,228,251 A | 7/1993 | Frigan | 52/111 |
| 5,235,965 A | 8/1993 | Hiroya | 600/108 |
| 5,305,121 A | 4/1994 | Moll | 348/45 |
| 5,374,953 A | 12/1994 | Sasaki et al. | 348/65 |
| 5,376,960 A | 12/1994 | Wurster | 348/76 |
| 5,379,756 A | 1/1995 | Pileski et al. | 600/109 |
| 5,526,041 A * | 6/1996 | Glatt | 348/143 |
| 5,538,497 A | 7/1996 | Hori | 600/182 |
| 5,579,174 A | 11/1996 | Tachihara et al. | 359/784 |
| 5,587,839 A | 12/1996 | Miyano et al. | 359/660 |
| 5,598,205 A | 1/1997 | Nishioka | 348/65 |
| 5,894,323 A * | 4/1999 | Kain | 348/116 |
| 6,092,008 A * | 7/2000 | Bateman | 701/14 |
| 6,246,320 B1 * | 6/2001 | Monroe | 340/506 |
| 6,264,135 B1 * | 7/2001 | Dacosta | 244/1 R |
| 6,405,975 B1 * | 6/2002 | Sankrithi | 244/1 R |

* cited by examiner

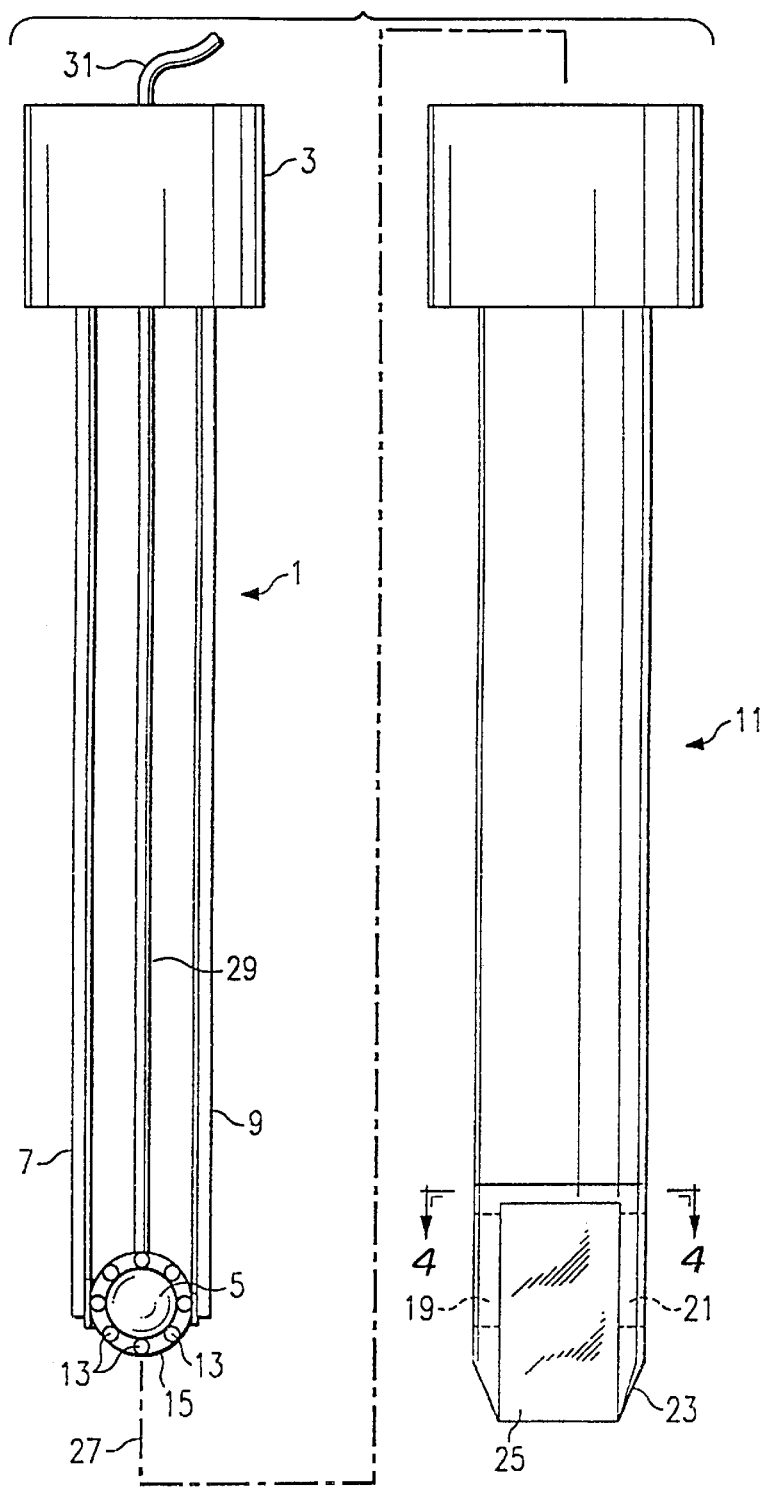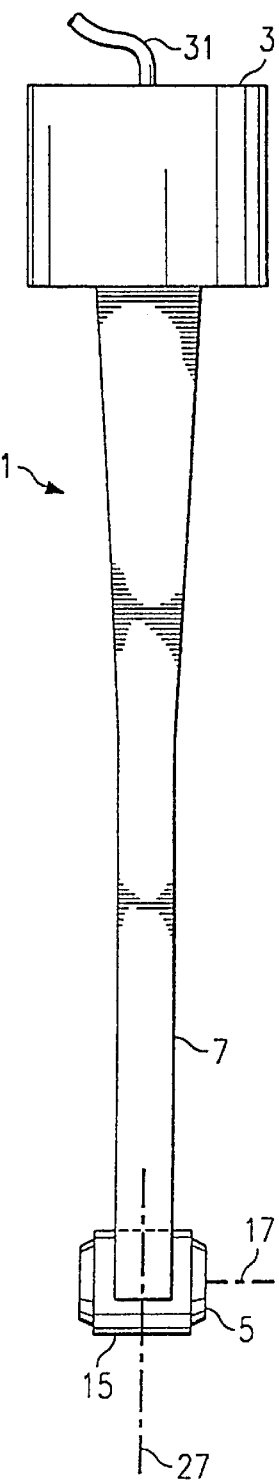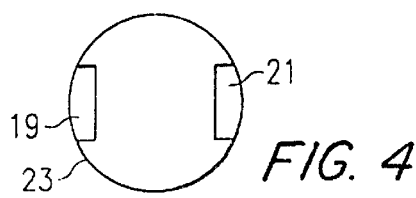

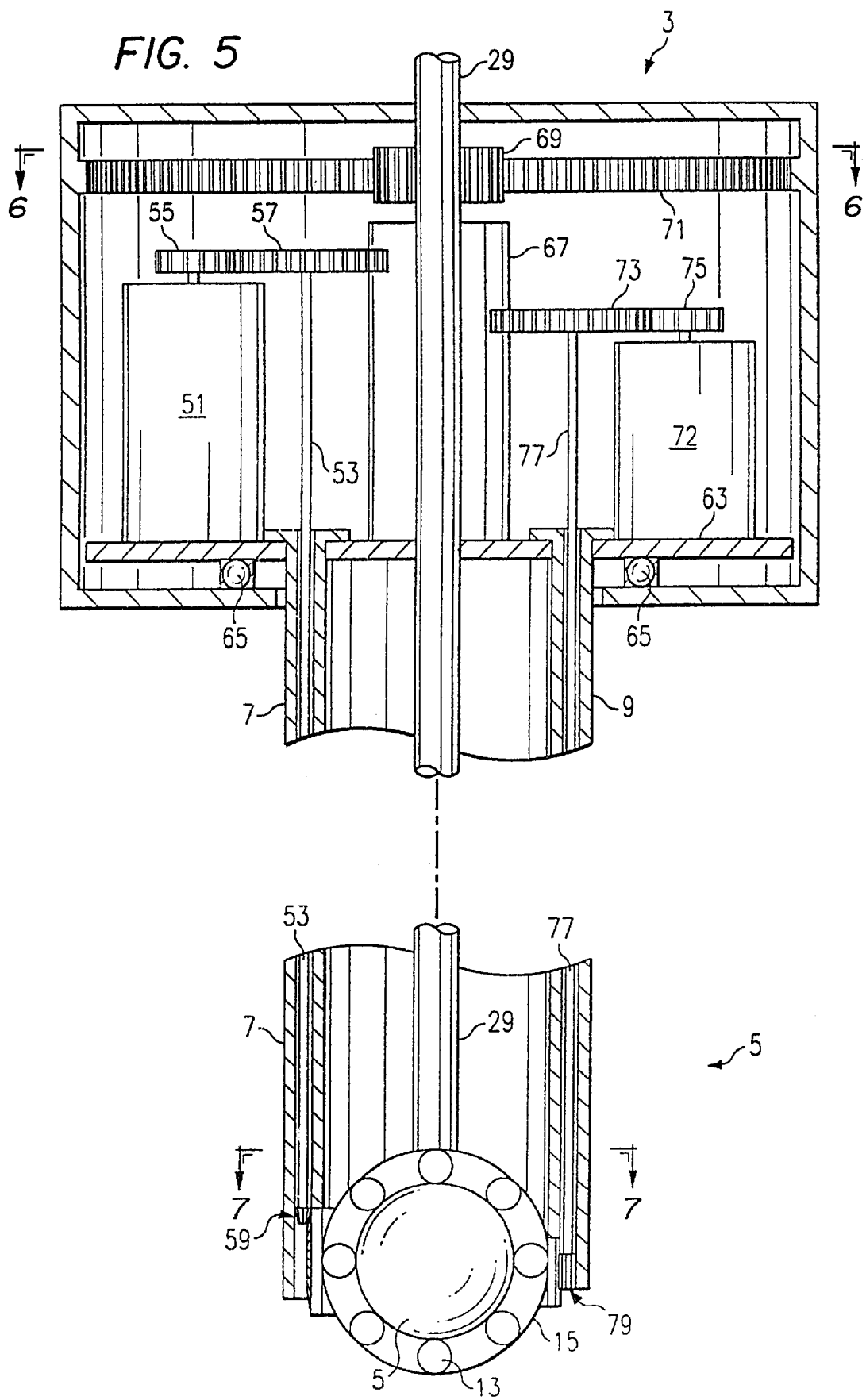

AIRCRAFT MONITORING AND ANALYSIS SYSTEM AND METHOD

This application claims priority under 35 U.S.C. §119 (e) to U.S. provisional patent application Ser. No. 60/054,198, entitled "Videoscope", filed Jul. 30, 1997, and U.S. provisional patent application Ser. No. 60/054,197, entitled "Aircraft Monitoring System", filed Jul. 30, 1997, which are incorporated herein by reference in their entirety.

BACKGROUND OF THE INVENTION

1. Field of the Invention

The present invention is directed to optical imaging systems. More particularly, the present invention is directed to an optical imaging system having an image receiving head that can be remotely positioned with respect to other portions of the optical imaging system.

2. Discussion of the Related Art

Optical imaging systems are used in a wide variety of applications. For example, optical imaging systems are used for surveillance and/or security in residential, commercial, and military settings. Endoscopic optical imaging systems are used in the medical field for performing surgical and diagnostic procedures inside the body. In addition to the above-described uses, optical imaging systems can also be used in conventional photographic applications, such as still photography or video recording.

In a conventional optical imaging system, the portion of the imaging system that receives light from a target is physically disposed next to other portions of the imaging system that store, process, or display the image. For example, in a conventional surveillance/security system, a lens, a charge coupled device (CCD) camera, and other electronic components (such as an amplifier, an image processor, etc.) are all disposed within the same camera housing.

Other portions of the imaging system (e.g., image storage and/or display) may also be disposed in the camera housing, or may be disposed in a remote location that is connected to the camera housing via cables. However, because much of the optical imaging system is disposed within the camera housing, the camera housing is relatively large, heavy, and obtrusive.

In the medical field, due to the small size requirements imposed by invasive surgical and diagnostic procedures, most optical imaging systems include an assembly of optical fibers and a lens that is inserted into the patient. The assembly of optical fibers and the lens relay light received from the target to the rest of the system (e.g., a CCD camera, amplifiers, an image processor, an image storage device and/or a display, etc.) located outside of the patient and typically within the same housing. Although this arrangement permits the portion of the optical imaging system that is inserted into the patient to be quite small, such optical fiber-based imaging systems are expensive to purchase and maintain.

Conventional photographic and video recording systems generally include all of the portions of the imaging system, including the image storage medium (e.g., film) and display, to within a single camera body. This arrangement makes the camera or video recorder a relatively large and heavy device. Furthermore, the viewing axis of the optical elements (e.g., the lens in a conventional camera, or the lens and CCD in a digital camera) that receive light from the target is fixed relative to the body of the camera. Thus, the body of the camera must always be pointed in the direction of the object being viewed.

SUMMARY OF THE INVENTION

According to one aspect of the present invention, an optical imaging system is provided that includes an image receiving camera head that can be remotely positioned with respect to other portions of the optical imaging system. In one embodiment of the present invention the camera head includes a lens assembly and a CCD camera. The CCD camera is coupled to the rest of the imaging system by a flexible connection that permits the camera head to be remotely positioned with respect to other portions of the optical imaging system. This remote positioning capability permits the image receiving camera head to be used in a wide variety of imaging systems. Moreover, the physical dimensions of the image receiving camera head permits its use in those applications where small size and/or weight are significant.

According to one embodiment of the present invention, a camera is provided that includes a camera head, an amplifier, and a camera control unit. The camera head includes a charge coupled device and at least one lens that is optically coupled to the charge coupled device to focus light energy onto the charge coupled device. The charge coupled device provides a plurality of signals indicative of the light energy incident upon a plurality of regions of the charge coupled device. The amplifier is electrically coupled to the charge coupled device to receive the plurality of signals from the charge coupled device and provide a plurality of amplified signals to the camera control unit, but, the amplifier is physically separated from the charge coupled device so that the amplifier is outside the camera head. The camera control unit is electrically coupled to the amplifier to receive the plurality of amplified signals from the amplifier and to process the plurality of amplified signals to form an image.

According to another embodiment of the present invention, a camera system is provided that includes an image receiving device and a switch. The switch enables images seen by the image receiving device to be stored on a storage medium when the switch is to activated. The camera system has at least two modes of operation including a first mode that stores the images seen by the image receiving device at fixed intervals of time in response to activation of the switch, and a second mode that stores only a single still image seen by the image receiving device in response to activation of the switch.

According to another embodiment of the present invention, a camera is provided. The camera includes a camera body that is adapted to be held by a user of the camera, an image receiving device having an optical viewing axis, and a display that is mounted to the camera body to display images seen by the image receiving device. The image receiving device is movably mounted to the camera body for movement relative to the camera body in at least one direction other than along the optical viewing axis of the image receiving device so that a direction of the optical viewing axis of the image receiving device can be altered without changing an orientation of the camera body.

According to a further embodiment of the present invention, a camera is provided that includes a camera body, an image receiving device having an optical viewing axis, and a support member. The support member has a first end that is mounted to the camera body and a second end that is mounted to the image receiving device. The second end of the support member is movable toward and away from the camera body in a direction other than along the optical viewing axis of the image receiving device.

According to another embodiment of the present invention, a lens system for a camera is provided. The lens system includes, in or from an object side, a distal lens having a convex surface and a concave surface, the convex surface being proximate the object side, a doublet lens in optical communication with the distal lens, and a bi-convex proximal lens in optical communication with the doublet lens. The doublet lens has a concave surface and a convex surface, with the convex surface of the doublet lens being proximate the convex surface of the distal lens.

According to a further embodiment of the present invention, a monitoring system for an airplane is provided. The monitoring system includes at least one image receiving device to be disposed along a surface of the airplane and view a portion of the airplane. Advantageously, the image receiving device can be disposed along an interior surface of the airplane, the exterior of the airplane, or both.

BRIEF DESCRIPTION OF THE DRAWINGS

Illustrative embodiments of the present invention are described by way of example with reference to the accompanying drawings, in which:

FIG. 2 is a front view of a surgical/diagnostic imaging device in accordance with one embodiment of the present invention;

FIG. 3 is a partially cutaway side view of the imaging device of FIG. 2;

FIG. 4 is a cutaway top view taken through plane 3—3 in FIG. 2, of a sheath cap in the imaging device of FIG. 2;

FIG. 5 is an enlarged cutaway side view of the upper housing and the lower portion of the imaging device of FIG. 2;

DETAILED DESCRIPTION

According to one aspect of the present invention, an optical imaging system is provided that includes a positionable image receiving head that can be remotely positioned with respect to other portions of the optical imaging system. In one embodiment, the camera head includes a lens assembly and a CCD camera with other portions of the imaging system being physically separated from the camera head. Because other portions of the imaging system are physically separated from the camera head, the camera head can be very small and light in weight. This small size and light weight permits the camera head to be used in a wide variety of applications. Examples of such applications include use in an endoscope, a videoscope, an aircraft monitoring system, and other imaging systems as discussed below.

Figure 1:
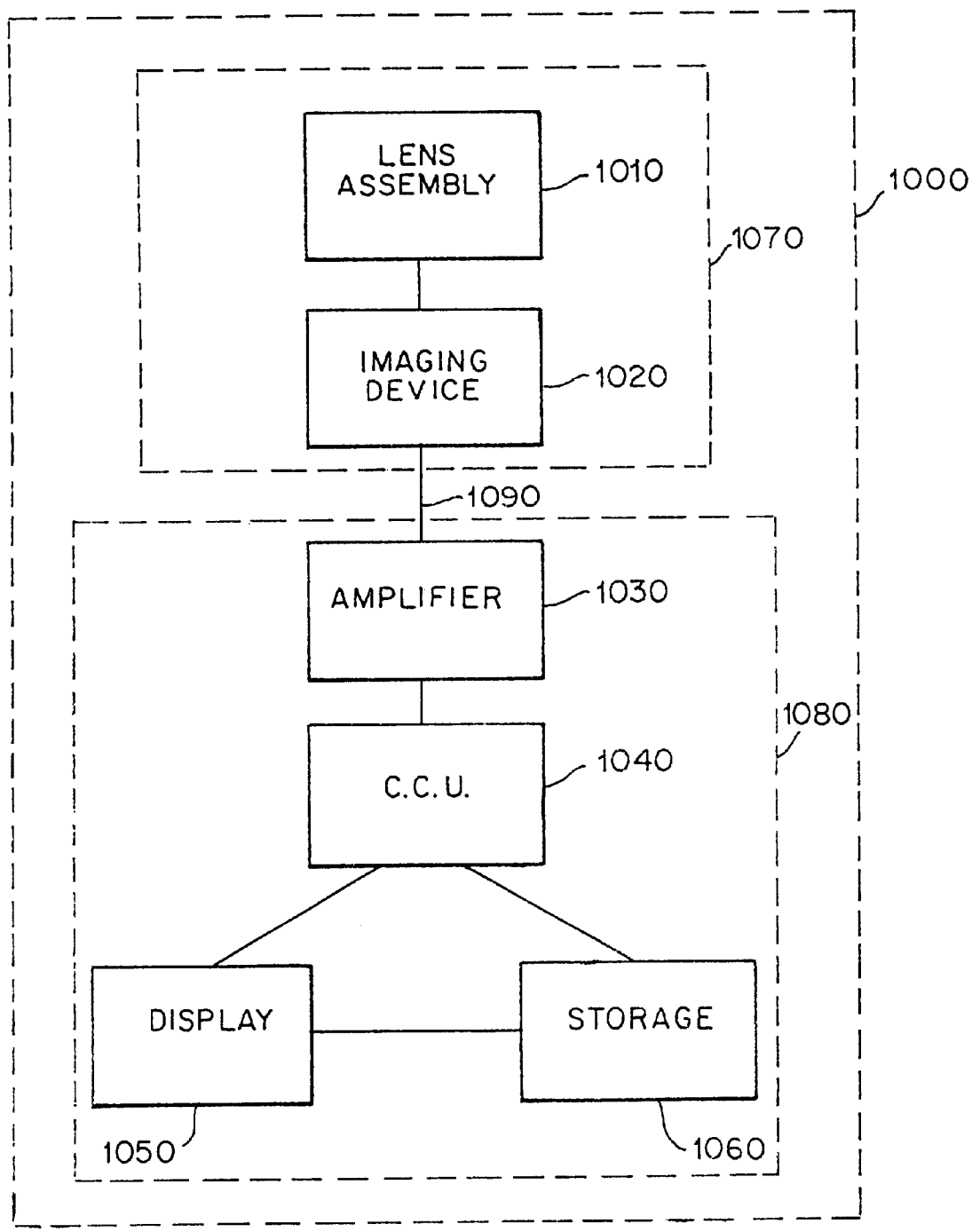
FIG. 1 is a functional block diagram of an optical imaging system according to one aspect of the present invention.

FIG. 1 is a functional block diagram of an optical imaging system according to one embodiment of the present invention. As shown in FIG. 1, the optical imaging system 1000 includes a camera head 1070 that is coupled to a camera body 1080. Camera head 1070 includes a lens assembly 1010 and an imaging device 1020. Light from a target enters lens assembly 1010 and is focused on the imaging device 1020. In one embodiment, the imaging device is a charge coupled device (CCD). However, it should be appreciated that the imaging device 1020 can alternatively be of another type, such as a microbolometer array (e.g., an infra-red detection array) that is capable of perceiving objects at very low levels of light, as the present invention is not limited to the use of a CCD as the imaging device.

Imaging device 1020 includes a plurality of pixel elements (e.g., photo diodes) that converts light energy focused by the lens assembly 1010 into a plurality of electrical signals. The plurality of electrical signals from the imaging device 1020 are provided to an amplifier 1030 that is coupled to the imaging device 1020 by a connection 1090. Amplifier 1030 amplifies each of the plurality of electrical signals from the imaging device 1020 and provides the amplified electrical signals to a camera control unit (CCU) 1040 that forms an image based on the plurality of amplified electrical signals. CCU 1040 can be a microprocessor-based system that may include some memory (not shown) for temporarily storing an image prior to providing the image to a display 1050 and/or a storage (recording) device 1060. Alternatively, the CCU 1040 can provide the image directly to the display 1050 or storage device 1060. As shown in FIG. 1, the display 1050 can be coupled to the storage device 1060 so that a previously recorded image (or images) can be displayed on the display 1050.

According to one aspect of the present invention, the imaging device 1020 is coupled to the amplifier 1030 by a flexible connection 1090, such as a flexible cable or a flexible circuit. Accordingly, the optical elements in the camera head 1070 that focus and receive light from the target (e.g., the lens assembly 1010 and the imaging device 1020) need not be in-line with the amplifier 1030 or other elements of the imaging system (e.g., those elements in the camera body 1080), and can be positionable independently therefrom. This in contrast to a conventional camera in which the lens, the viewing aperture and the recording medium (e.g., film) are optically aligned within the body of the camera. Furthermore, flexible connection 1090 also permits the lens assembly 1010 and the imaging device 1020 to be located within the camera head 1070 of the imaging system 1000, with the amplifier 1030 and the CCU 1040 being disposed in a physically separate camera body 1080. The display 1050 and storage device 1060 can be disposed in the camera body 1080 of the imaging system 1000 along with amplifier 1030 and CCU 1040 as shown in FIG. 2, or they may alternatively be disposed in a location separate therefrom.

The physical separation of the lens assembly 1010 and the imaging device 1020 from other portions of the imaging system 1000 provides a number of advantages over conventional imaging systems in which all of these devices (i.e., the lens assembly 1010, the imaging device 1020, and the amplifier 1030) are located within the same housing. For example, separation of the amplifier 1030 from the camera head permits camera head 1070 to be significantly smaller and lighter in weight than that of conventional imaging systems. Alternatively, for a camera head of a fixed size, this separation permits the optical elements (e.g., the lens and CCD) within the camera head to be larger, thereby increasing image resolution. Furthermore, flexible connection 1090 and the small scale of the camera head 1070 permit the camera head to be pivoted and/or rotated in a confined space for viewing in a number of different directions.

In one exemplary embodiment of the present invention, the optical imaging system described in FIG. 1 can be used as a surgical/diagnostic imaging device for use in interabdominal, interthoracic, and other surgical and diagnostic procedures. Examples of such a surgical/diagnostic imaging device are described in U.S. Pat. No. 5,762,603 (hereinafter, the '603 patent) which is entitled "Endoscope Having Elevation and Azimuth Control of Camera Assembly" and shares an inventor with the present application. The surgical/diagnostic imaging devices of the '603 patent are described below with reference to FIGS. 2–12.

FIGS. 2–4 show a surgical/diagnostic imaging device 1 for use in interabdominal, interthoracic, and other surgical and diagnostic procedures. The device 1 comprises an upper housing 3, a camera housing 5, and left and right camera housing supports 7, 9. Before use, the device 1 is inserted into a sterile sheath 11. The device 1 and sheath 11 (collectively, the "camera") are then inserted through an incision into the patient's body (not shown). The camera is inserted so as to place the camera housing 5 in a position from which it can be pointed at the surgical site or the area to be diagnosed. The incision is sealed around the camera with a purse string stitch, thereby preventing leakage of the $CO_2$ gas which is used to distend the patient's abdomen or chest during surgery or diagnosis.

In this embodiment, the sheath 11 is constructed of medical-grade plastic provided in a sterilized condition, and is intended to be disposed of after use. Alternately, the sheath 11 can be constructed of heat-resistant materials to allow it to be sterilized using an autoclave, then reused. It will be appreciated that the sterile sheath 11 eliminates the need to sterilize the camera.

The camera housing 5 contains a CCD (not shown) and a zoom lens assembly (not shown). A plurality of high intensity lights 13 are mounted within a light housing 15 which extends about the outer circumference of the camera housing 5. The lights 13 are aligned with the focal axis 17 of the CCD, and they illuminate the area at which the camera housing 5, and hence, the CCD are pointed.

When the device 1 is inserted in the sheath 11, the left and right camera housing supports 7, 9 engage complimentary locking keys 19, 21 within a sheath cap 23. As a result, the camera housing 5 is locked into a position in which the CCD's focal axis 17 is aligned perpendicular to an optically-clear window 25. In addition, as will be described below in connection with FIGS. 4–6, the locking keys 19, 21 cause the sheath cap 13 to rotate about the longitudinal axis 27 of the camera when the camera housing supports 7, 9 are rotated, about that axis.

The image system of the device 1 can be implemented using the techniques described above in connection with the imaging system 1000 of FIG. 1. The camera housing 5 can include only the CCD and the lens assembly, with the amplifier 1030, CCU 1040 and other components of the imaging system being disposed outside the body of the device 1. A camera cable 29 extends between the camera housing 5 and the upper housing 3. The camera cable 29 contains conductors which carry the CCD's signals to the upper housing 3 and which supply electrical power to the CCD and lights 13. An imaging device cable 31 is provided to carry control signals and supply electrical power to the device 1, and to carry the CCD's signals to the externally-located processing, display and storage devices (not shown) of the imaging system.

The length of the camera housing supports 7, 9 and the length of the sheath 11 are varied to accommodate variation in the thickness of the abdominal walls of patients and to allow the camera to be used in thoracic surgery/diagnosis. Three lengths are provided: three, six, and eleven inches below the upper housing 3.

Figure 6:
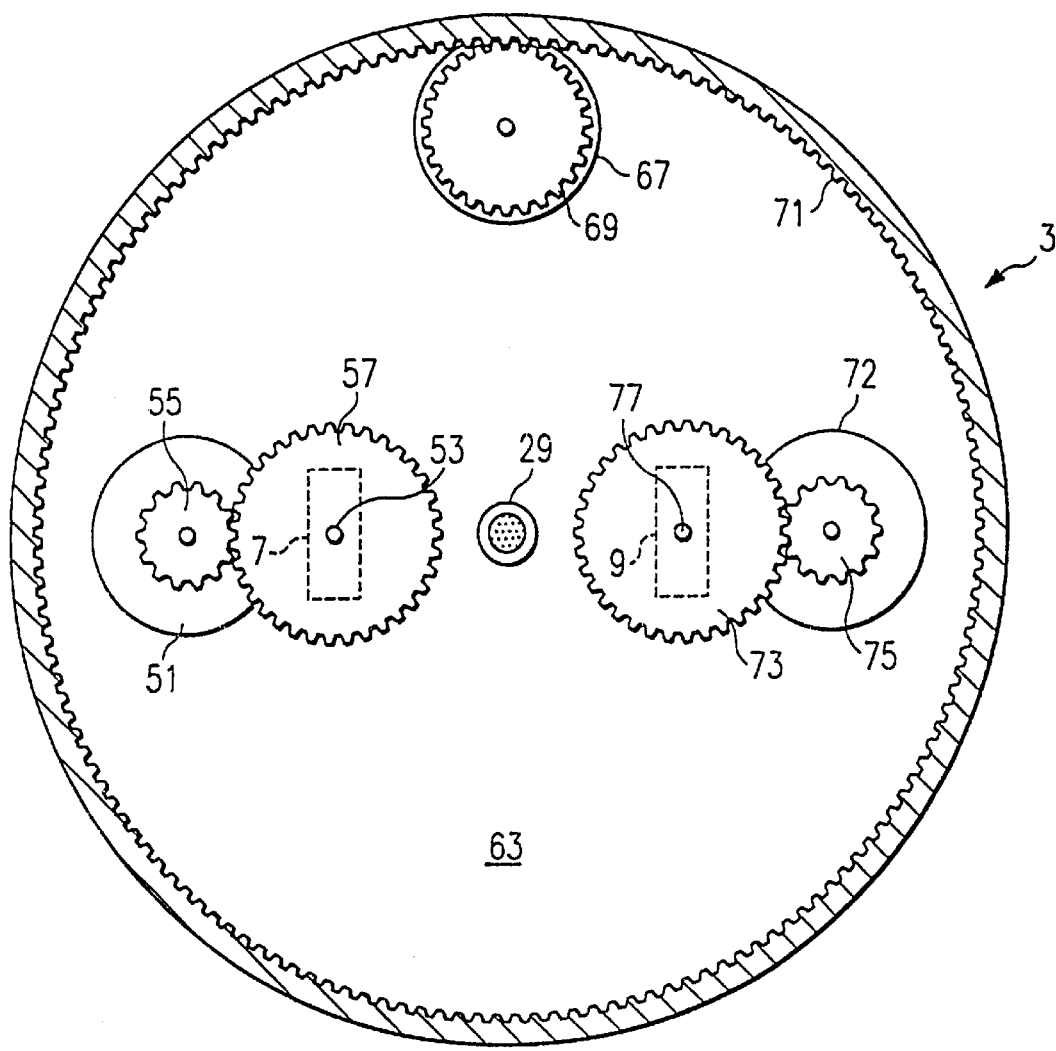
FIG. 6 is a cutaway top view of the upper housing of the imaging device of FIG. 2 taken through plane 5—5 in FIG. 5.
Figure 7:
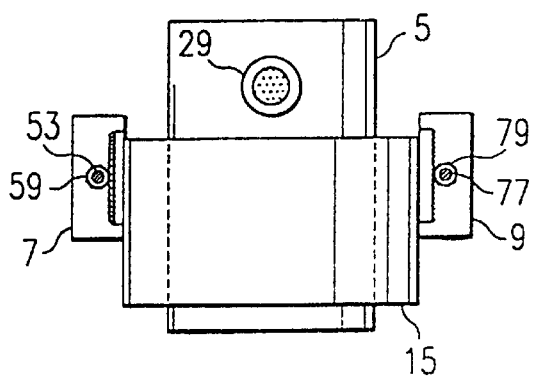
FIG. 7 is a cutaway top view of the lower portion of the imaging device of FIG. 2 taken through plane 6—6 in FIG. 5.

Referring now to FIGS. 5–7, an elevation motor 51 drives an elevation shaft 53 by means of gears 55, 57. The elevation shaft 53 extends downwardly through the hollow left camera support 7. A ring and pinon gear arrangement 59 at the lower end of the elevation shaft 53 transfers the rotary motion of the elevation shaft 53 to the camera housing 15, thereby causing the camera housing 15 to elevate or depress, depending on the direction of rotation of the elevation motor 51. In this embodiment of the invention, the camera housing 15 can be elevated 70 degrees above and depressed 90 degrees below a plane perpendicular to the longitudinal axis 27 of the camera and passing through intersection of the longitudinal axis 27 and the focal axis 17 of the camera.

The elevation motor 51 is mounted on a plate 63. The plate 63 is rotatably mounted within the upper housing 3 on a bearing 65. An azimuth motor 67 is also mounted on the plate 63. The azimuth motor 67 drives an azimuth gear 69. The azimuth gear 69 engages a housing gear 71 which is attached to the inner surface of the upper housing 3. When the azimuth motor 67 rotates, the plate 63 rotates within the upper housing 3. In this embodiment, the plate 63 rotates plus or minus 180 degrees to minimize the amount the camera cable 21 is twisted. Full 360 degree rotation can easily be achieved by using conventional slip rings.

A zoom/focus motor 72 drives gears 73, 75, which rotate a zoom/focus shaft 77. The zoom/focus shaft extends downwardly through the right camera support 9. At the bottom of the focus shaft 77, a ring and pinon arrangement 79 transfers the rotary motion of the focus shaft 77 to a zoom lens mechanism (not shown) within the camera housing 5.

Figure 8:
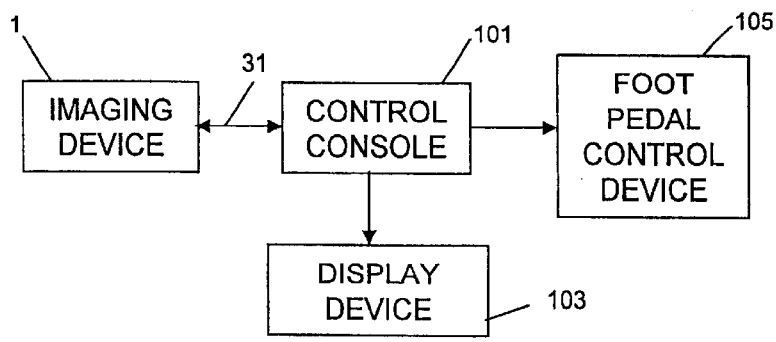
FIG. 8 is a functional block diagram of a system for controlling the imaging device of FIG. 2 and for displaying the images transmitted by the imaging device.

Referring now to FIG. 8, the imaging device 1 is connected to a control console 101 by means of the imaging device cable 31. Signals from the CCD of the imaging device 1 are amplified by circuits in the control console 101 and directed to a display device 103. In one embodiment, the display device 103 is a conventional television set.

A foot pedal control assembly 105 allows the surgeon (not shown) to control the imaging device 1. The foot pedal control assembly 105 includes four controls (not shown): (1) camera housing left and right; (2) camera housing up and down; (3) zoom in and out; and (4) light intensity up and down. Signals from the foot pedal control assembly 105 are routed to the control console 101. Circuits (not shown) in the control console 103 convert the control assembly signals into signals which are suitable to control the imaging device 1, then route the converted signals to the imaging device 1.

Figure 9:
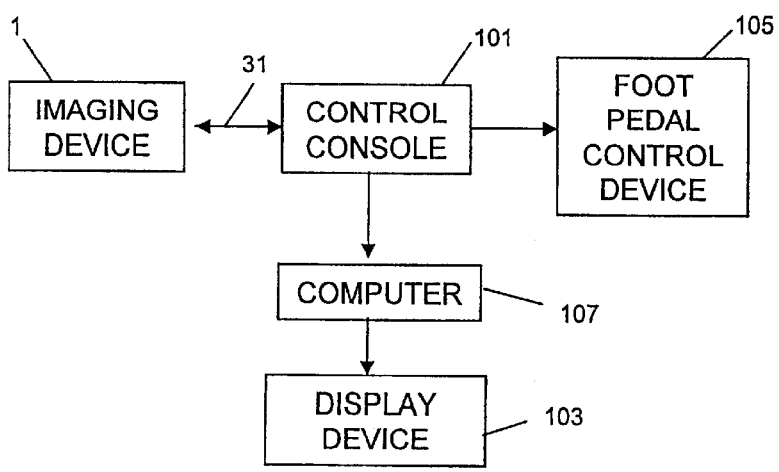
FIG. 9 is a functional block diagram of an alternate control and display system for the imaging device of FIG. 2.

In the embodiment shown in FIG. 9, a computer 107 is interposed between the control console 101 and the display device 103. A plurality of computer programs contained in the computer 107 allow operating team personnel to manipulate and/or store the signals from the imaging device 1.

Figure 11:
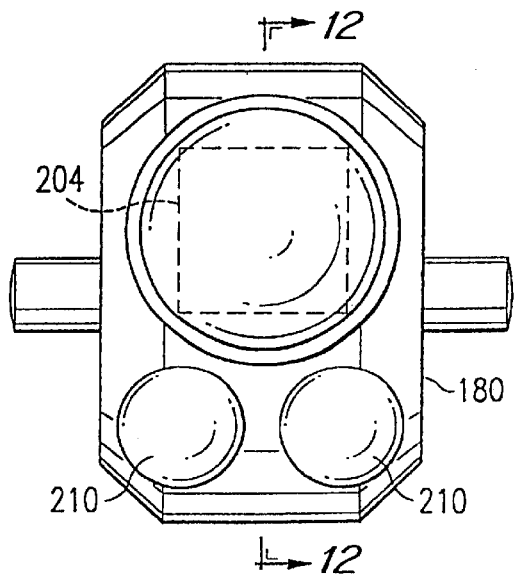
FIG. 11 is a front view of the camera housing of the image device of FIG. 10.
Figure 12:
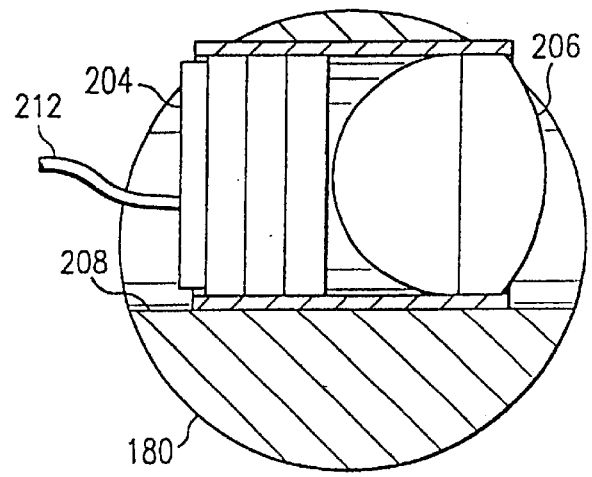
FIG. 12 is a cutaway side view of the camera housing taken through plane 11—11 in FIG. 10.
Figure 10:
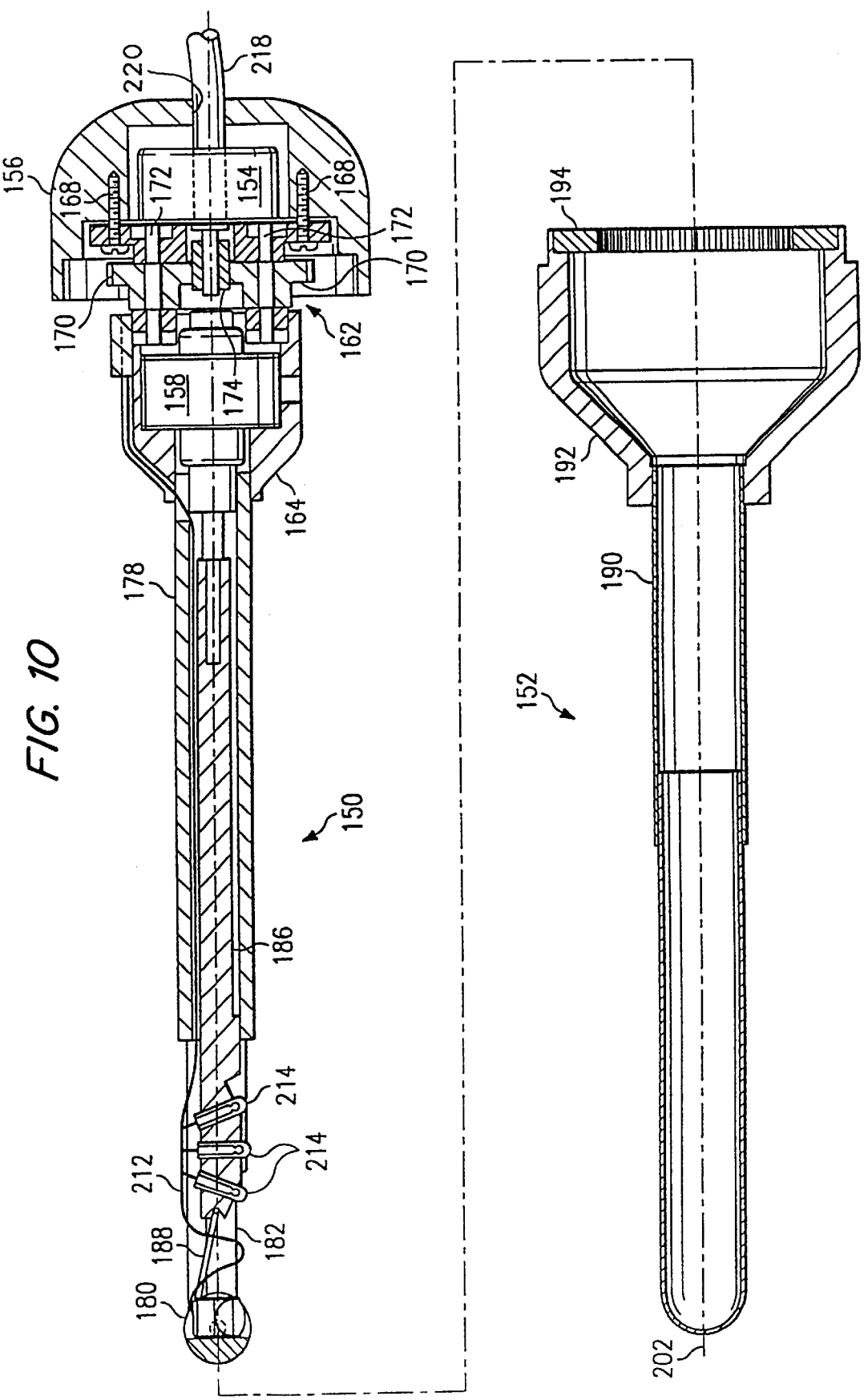
FIG. 10 is a cutaway side view of an alternate embodiment of a surgical/diagnostic imaging device in accordance with the present invention.

FIGS. 10–12 illustrate a second surgical/diagnostic imaging device in which the imaging device of the present invention can be employed. Referring first to FIG. 10, the surgical/diagnostic device comprises two major assemblies: a camera assembly 150 and a disposable sheath assembly 152.

In the camera assembly 150, a rotary stepper motor 154 is rigidly mounted in an upper housing 156. A linear stepper motor 158 and the distal end of a planetary gear assembly 162 are press fitted in a linear stepper motor housing 164. The proximal end of the planetary gear assembly 162 is attached to the upper housing 156 by screws 168.

Three planetary gears 170 (only two of which are shown in FIG. 10) are rotatably mounted on pins 172 within the planetary gear assembly 162. The rotary stepper motor 154 drives the planetary gears 170 through a sun gear 174.

The proximal end of a camera support tube 178 is press fitted in the linear stepper housing 164. A camera housing 180 is pivotally mounted between pair of arms 182 (only one of which is shown in FIG. 10) that are integral with and extend from the distal end of the camera support tube 178. The linear stepper motor 158 acts through a pushrod 186 and a fork 188 to control the elevation of the camera housing 180.

The disposable sheath assembly 152 comprises a sheath 190, a sheath housing 192, and a ring gear 194. The distal portion of the sheath 190 is optically clear. The proximal end of the sheath 190 is adhesively attached within the distal end of the sheath housing 192. The ring gear 194 is adhesively attached within the proximal end of the sheath housing 192.

Prior to use, the camera assembly 150 is inserted into the sheath assembly 152, and the planet gears 170 engage the ring gear. As a result, when the rotary stepper motor 154 is actuated, the camera assembly 150 rotates in relation to the longitudinal axis 202 of the sheath assembly.

As is best shown in FIGS. 11 and 12, a CCD assembly 204 and a lens 206 are mounted within a camera bore 208 in the camera housing 180. A pair of high intensity lights 210 are mounted in bores that are coaxial with the camera bore 208.

A multi-conductor flexcable 212 provides the necessary connections for the CCD assembly 204, for the camera housing lights 210, and for three high intensity lights 214, that. are disposed in bores in the pushrod 186. The flexcable 212 extends from the camera housing 180 to the upper housing 156. In the upper housing 156, the flexcable 212 is combined with power and control wires (not shown) for the rotary stepper motor 154 and the linear stepper motor 158 to form the camera assembly cable 218. The camera assembly cable 218 passes through an orifice 220 in the upper housing 152. As with the surgical/diagnostic device of FIGS. 2–9, the camera assembly cable 218 connects the camera assembly 150 to external display and control devices (not shown).

Another application for the imaging system of FIG. 1 is in a videoscope. The separation of the imaging device 1020 (FIG. 1) from the amplifier 1030 and CCU 1040 enables the videoscope to employ a number of advantageous features not found in conventional video recorders.

Figure 13:
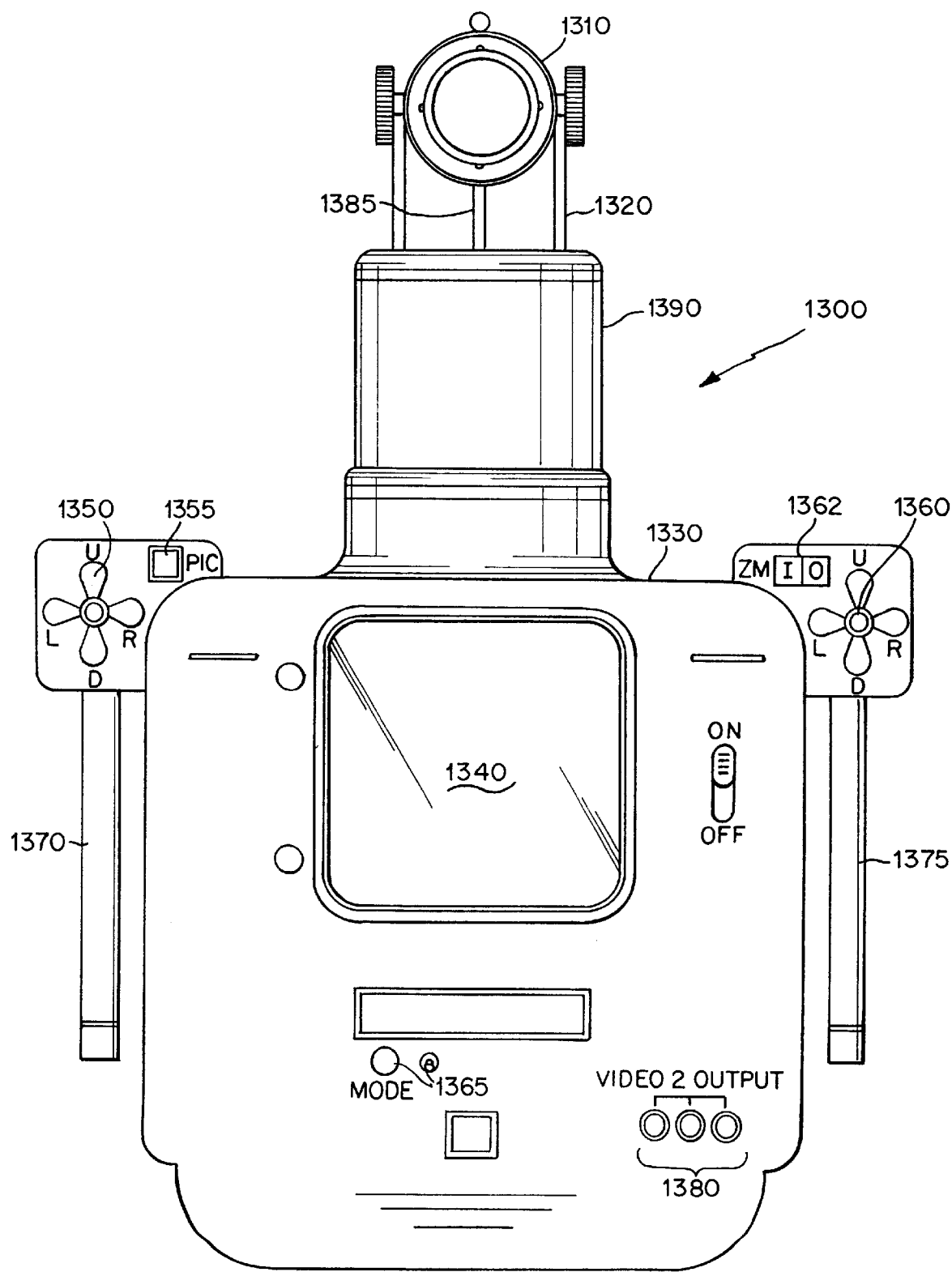
FIG. 13 illustrates an exemplary embodiment of a videoscope according to another aspect of the present invention.

An illustrative implementation of a videoscope according to one embodiment of the present invention is shown in FIG. 13. One feature of the videoscope 1300 is the mounting of an optical housing 1310 (similar to the camera head 1070 of FIG. 1) enclosing the optical components (e.g., the lens and CCD in a digital camera) to a movable support 1320 so that the optical components can be moved relative to the body 1330 of the videoscope 1300. Prior to Applicants' invention, it is believed that no system had ever been developed wherein the active optical element on which the lens focuses the light (e.g., the CCD in a digital camera) is moveable relative to the body 1330 of the videoscope 1300. Thus, the present invention encompasses a videoscope wherein such an active optical element is moveable relative to the body of the scope. As discussed below, this capability provides tremendous flexibility in the manner in which the videoscope can be used.

In addition, in contrast to conventional camera systems, in one embodiment of the present invention the lens is moveable relative to the body of the camera in ways other than the conventional movement in and out along its optical axis to change the focusing or zoom of the camera, and the rotation of the lens that sometimes results when altering the focus or zoom. Thus, one embodiment of the present invention is directed to a camera wherein the lens is moveable relative to the body of the device in ways other than this conventional way.

In the embodiment shown in FIG. 13, the movable support 1320 can move the housing 1310 in numerous directions, including rotationally, pivotally, and towards and away from the body 1330 of the videoscope 1300. Of course, it should be appreciated that the invention is not limited to movement in all of these directions, as alternate embodiments can be directed to movement in any one of these directions, each of which is advantageous. In one implementation, the periscope 1320 acts in a manner similar to an automatic car radio antenna and can dispose the optical housing 1310 away from the body 1330 of the videoscope by any distance up to three feet. It should be understood that the present invention is not limited in this respect, and that a longer or shorter periscope can alternatively be provided, and that the periscoping feature need not be employed at all.

The videoscope of the present invention can perform a number of operations. First, the videoscope can act as a video recorder by recording the images seen by the optical elements at the end of the periscope 1320 onto a recording medium coupled to the videoscope. The recording medium can be any type of medium for recording video information. For example, for a digital scope, the images can be stored on any digital type of storage medium, including a hard drive, a CD, a floppy disc, etc. In addition, the storage medium can either be mounted to the body 1330 of the videoscope, or can be mounted on a separate device coupled to the videoscope. The coupling can occur via cables, or a wireless transmission system can be employed to transmit information from the videoscope to a remote storage medium. The information stored on the recording medium can be played on a display screen 1340 of the videoscope, or on a remote display coupled to the recording medium.

In addition to recording information, the videoscope of the present invention can also act as an image display device, as the videoscope includes a display screen 1340 on which images seen by the optical components at the end of the periscope 1320 can be displayed. It should be appreciated that the display screen 1340 can be employed to view images being recorded by the videoscope, or images seen by the optical components of the scope even when not recording. Thus, the periscoping feature 1320 of the videoscope can be employed advantageously to view areas that might otherwise be inaccessible to the user of the scope. For example, at a sporting event (e.g., a golf tournament), parade or other crowded event, the videoscope can be employed by raising the periscope to a height above the crowd, allowing the user to view an event without obstruction. Alternatively, the scope can be used to look over other types of objects (e.g., a wall) or around a corner. For example, the scope can be used by law enforcement officials in a situation where a suspect could potentially fire at the officers from around a corner. The officers could extend the optical housing 1310 of the scope beyond the corner, allowing the officers to view the area without exposing themselves to danger.

As with the recording medium, it should be understood that the video screen 1340 can alternatively be separable from the body 1330 of the videoscope. In particular, the videoscope can be connected via cables or a wireless transmission system to a remote display screen (e.g., a computer screen).

In the embodiment depicted in FIG. 13, the videoscope 1300 includes controls 1350 for controlling the periscope 1320 and the optical housing 1310. The periscope 1320 can be controlled to move in the up and down directions, as well as to rotate left and right. In one embodiment of the present invention, the videoscope 1300 includes a second set of controls 1360 that permit movement of the periscope (up and down and rotation left and right) to be controlled with either hand of the user of the videoscope. Alternatively, in another embodiment of the present invention, the second set of controls 1360 permits left and right rotation of the periscope, while the up and down controls control movement of the optical housing 1310 relative to the periscope 1320 in the up and down (elevation) directions. Control signals can be provided to the optical housing by cable 1385, which may also provide image signals to the recording medium and/or the display. Control of the optical housing 1310 to achieve rotation and pivoting of the housing can be implemented using the technology described above in connection with FIGS. 2–12. However, the present invention is not limited in this respect, as numerous other mechanisms can be employed for movably mounting the housing 1310 to the body of the scope.

As shown in FIG. 13, the videoscope can also include a zoom feature 1362 (i.e., "ZM") wherein the field of view of the videoscope can be zoomed either in or out. The zoom can be either mechanical, digital or a combination. The videoscope 1300 also include a button 1355 that can be employed to enable recording. Depending on the selection of mode buttons 1365, the activation of button 1355 enables recording in either a still picture mode or a video recording (i.e., continuous) mode. In the still picture mode, the videoscope takes a single digital picture in response to the activation of button 1355 and stores that image on the recording medium. In the video recording mode, the videoscope takes a series of digital pictures at fixed intervals of time (e.g., twenty four or thirty images per second) in response to the activation of button 1355. The video recording mode is stopped by depressing button 1355 a second time. In this manner, the videoscope has the capability of both performing video recording and taking still digital pictures. That is, the videoscope can take a series of still digital pictures separated by a fixed sequence of time (i.e., like a digital video recorder) as well as take a single digital picture at a particular instant in time (i.e., like a conventional digital camera). It is believed that prior to Applicant's invention, no system had ever been developed that employed these two features in combination. It should be understood that the particular controls shown and their arrangement on the videoscope are provided merely for illustrative purposes, and that numerous other implementations are possible.

As shown in FIG. 13, the videoscope can include a pair of supports 1370, 1375 that enable the videoscope 1300 to be securely supported in a fixed location. Alternatively, a single mounting point for a support (e.g., a tri-pod mount) may be provided that permits the videoscope to be movably positioned on a mounting surface. Output jacks 1380 provide video output signals that can be connected to a remote display screen or another recording device.

Figure 14:
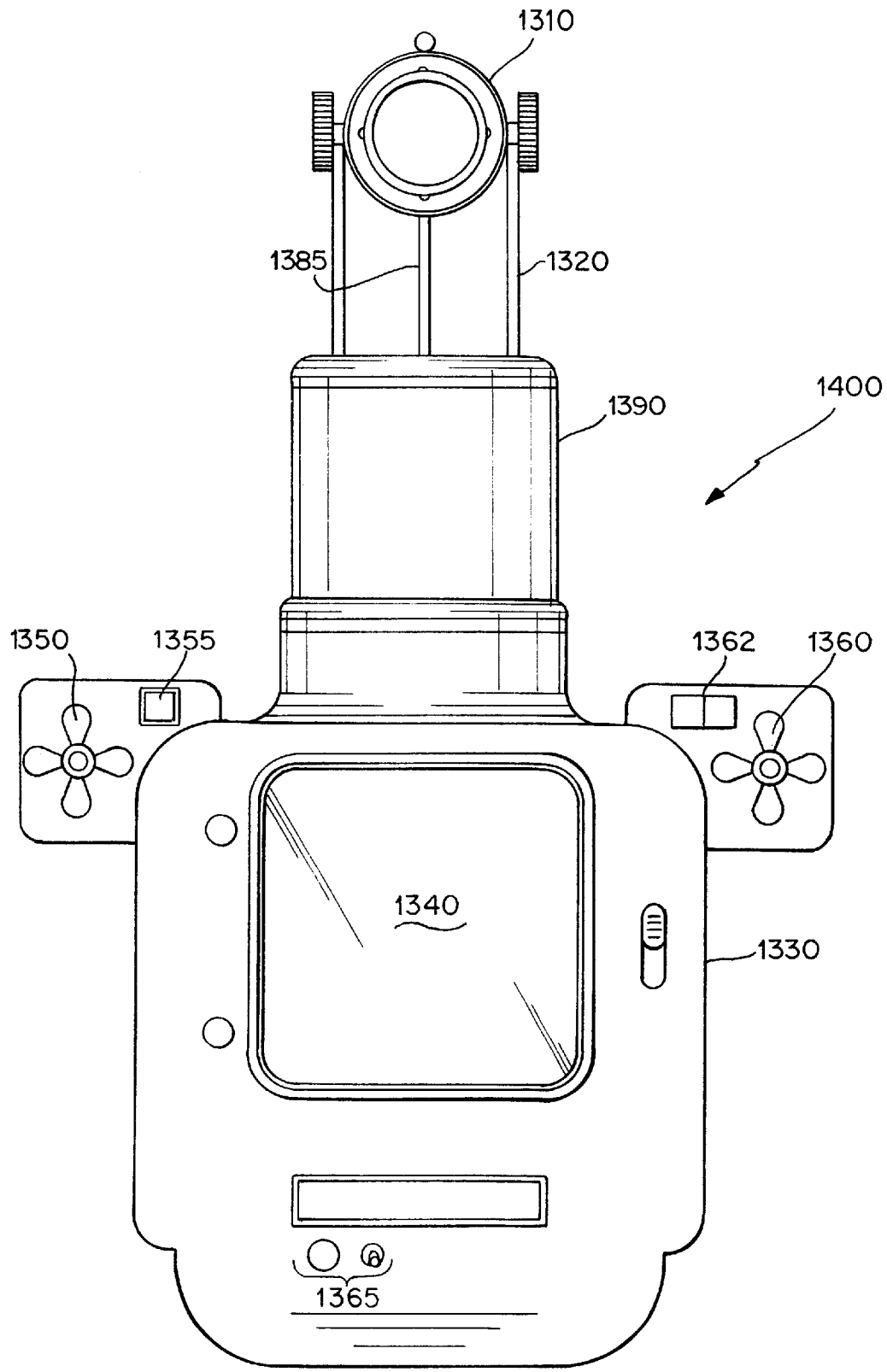
FIG. 14 illustrates an alternate embodiment of a videoscope according to another embodiment of the present invention.
Figure 15:
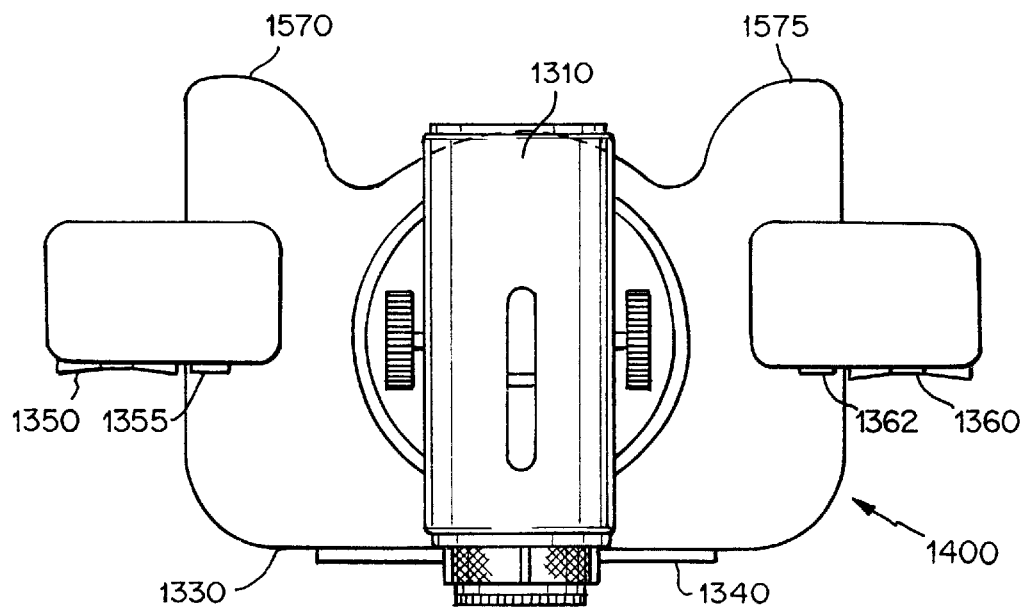
FIG. 15 is an overhead view of the videoscope of FIG. 14.

FIGS. 14 and 15 show a videoscope according to another embodiment of the present invention. In FIGS. 14 and 15, those features that are common to the embodiment shown in FIG. 13 are designated by the same reference numerals. In contrast to the embodiment of FIG. 13, the videoscope 1400 depicted in FIG. 14 does not include supports 1370, 1375 or output jacks 1380. This enables the videoscope of FIG. 14 to be more compact and lighter in weight than the embodiment shown in FIG. 13.

FIG. 15 shows an overhead view of the videoscope 1400 of FIG. 14. As shown, the back portion of the body 1330 of the videoscope (i.e., the side opposite the display 1340) includes contoured surfaces 1570, 1575 that enable an operator to securely hold the videoscope. It should be appreciated that the position of the contoured surfaces 1570, 1575 permit the operator to securely hold the videoscope while also permitting convenient thumb access to the controls (e.g., controls 1350, 1360, and button 1355). The contoured surfaces can also be employed with the embodiment of FIG. 13.

As shown in FIG. 15, the external dimensions of the optical housing 1310 can extend beyond the extension 1390 (FIGS. 13 and 14) in the body 1330 of the videoscope that encircles the periscope 1320. In one embodiment, the set of controls 1360 that alter the position of the optical housing 1310 relative to the body 1330 can be used to position (in elevation) the optical housing 1310 so that it may be retracted entirely within the extension 1390. This permits the periscope 1320 and the optical housing 1310 to be retracted for storage so that they are protected within the confines of extension 1390. A cap (not shown) can be provided to prevent the accumulation of dust or debris during storage. In an alternative embodiment, the optical housing 1310 and extension 1390 are dimensioned so that the optical housing 1310 can be fully retracted within extension 1390 regardless of the orientation of the optical housing 1310 with respect to the periscope 1320. Again, a cap can be provided to prevent the accumulation of dust or debris during storage.

Figure 16:
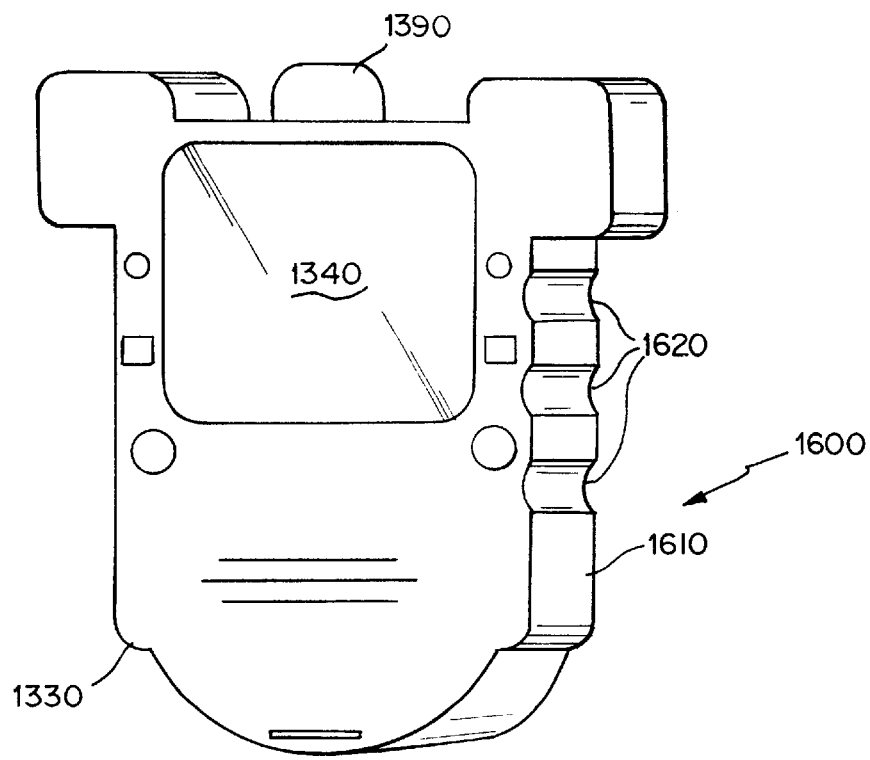
FIG. 16 is a perspective view of an alternate videoscope according to another embodiment of the present invention.

FIG. 16 shows a partial side view of a videoscope according to a further embodiment of the present invention. As shown in FIG. 16, each side 1610 of the body 1330 of the videoscope 1600 can include one or more indentations 1620 to enhance the ergonomics of the videoscope 1600. It should be appreciated that indentations 1620 can be used with either of the exemplary embodiments of FIGS. 13 and 14.

It should be appreciated that one aspect of the present invention embodied in the videoscopes of FIGS. 13–16 is directed to a digital camera in which the optical components (e.g., the lens and CCD within optical housing 1310) that perceive the image and the screen (e.g., 1340) that displays the image need not be respectively fixed on the front and back of the camera. Thus, through the use of a coupling medium (cables, wireless, etc.) between the optical components and the display screen, the videoscope of the present invention can have numerous different configurations. Thus, one aspect of Applicants' invention is a new paradigm that breaks away from the conventional design wherein the optical components that view the scene (e.g., the lens) are disposed at a fixed location on the front of the camera, and the display is disposed at a fixed location on the back. In this manner more useful and ergonomically appealing camera configurations are possible.

In another embodiment of the present invention, a docking station can be provided to which the videoscope can be mounted. In one implementation, the docking station enables the videoscope to be mounted in an upright and stable position. The docking station can 153 provide an interface (e.g., on the back of the videoscope) to another video screen, such as a television or computer screen. It should be appreciated that when the videoscope is implemented using digital technology and the storage medium is a CD, conventional technology (e.g., employed in laser disc players), can be employed to read the CD and display the image on a TV screen.

It should be appreciated that although the present invention provides the advantageous ability to perform multiple tasks, such as video recording, taking a still picture, and allowing the user to view live action on the display screen 1340, the present invention is not limited to inclusion of all of these capabilities. The aspects of the present invention discussed above can be employed in videoscopes employing less than all of these features.

It should be appreciated that when the videoscope is coupled to a computer via a docking station or other coupling mechanism, the images stored on the storage medium in the videoscope can be printed on the computer's printer. In addition, once the videoscope is coupled to the computer, it is contemplated that the images stored on the storage medium in the videoscope can be viewed on the display of the computer. Thus, these images can also be viewed by a remote computer that dials into the computer attached to the videoscope. In addition, the remote computer can also be used to control the videoscope. Thus, a capability is provided wherein the videoscope can be coupled to a first computer, for example at a home, and then the user can remotely dial in and control the videoscope via the remote computer to scan the area around the videoscope. This can be done for security reasons or, for example, to check on a babysitter or children left at home.

It should be appreciated that the periscoping feature of the videoscope of the present invention can be implemented in a number of ways. For example, when the videoscope is implemented using the technology discussed with respect to FIGS. 2–12 above, the entire imaging device (e.g., 1 in FIG. 2 or 150 in FIG. 10), including the upper housing (3, 156) can be moved upwardly and downwardly with the lens. Alternatively, the housing supports and the camera cable (7, 9 and 29 in FIG. 2) can be extendable and retractable to enable the periscoping feature of the present invention.

Figure 17:
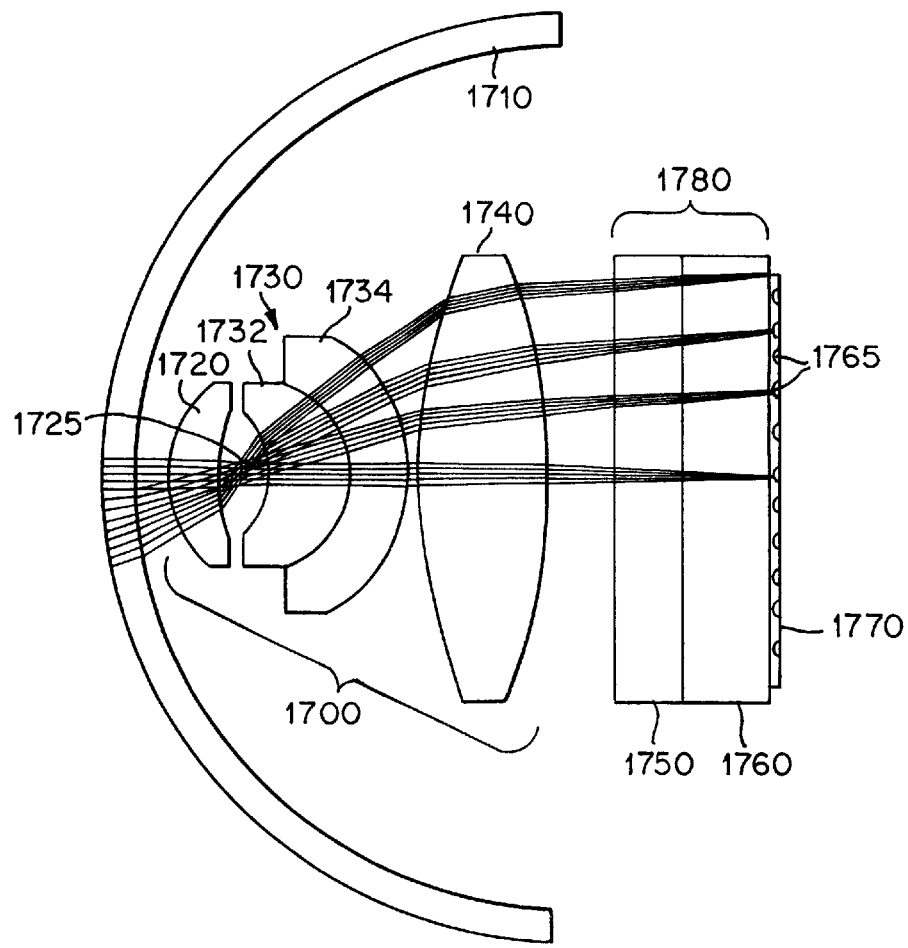
FIG. 17 illustrates a lens assembly according to a further aspect of the present invention.

FIG. 17 illustrates a lens assembly according to a further aspect of the present invention. The lens assembly 1700 provides a constant focus lens that can be used to focus light from a target onto an image receiving device, such as a CCD 1780. Optically, one embodiment of the lens assembly 1700 has an effective focal length of 3.53 mm in air, an F number of 11.2, and an angle of view of 34 degrees. These optical characteristics permit high resolution images to be taken of any object that is more than approximately one inch away from the lens assembly without requiring the use of focusing or lens positioning equipment. Because the lens assembly does not require any sort of lens positioning equipment to focus light on the CCD, the lens assembly 1700 can be quite small.

In one embodiment, the lens assembly 1700 is less than 5 mm in diameter and less than 5 mm in depth. This permits the lens assembly 1700 to be used in a variety of different devices. For example, the small size of the lens assembly 1700 is advantageous for the surgical/diagnostic imaging devices of FIGS. 2–12 used in minimally invasive surgical/diagnostic procedures. The lens assembly 1700 may also be advantageously used in the videoscopes of FIGS. 13–16, as the small scale of the lens assembly permits the periscope 1320 of the videoscope (FIG. 13) to be formed from light-weight materials. Although one skilled in the art will appreciate that other lens assemblies can be provided that achieve similar optical characteristics, such lens assemblies would generally include a greater number of distinct lenses, thus limiting their use in devices where it is desirable to minimize the physical dimensions of the lens.

As shown in the illustrative embodiment of FIG. 17, the lens assembly 1700 includes distal lens 1720, doublet lens 1730, and proximal lens 1740. The lens assembly 1700 may also include an outer lens 1710 to further focus light received from a target. Outer lens 1710 may be formed from a polycarbonate material having a radius of curvature of 5 mm, a thickness of 0.381 mm, and a diameter of 10 mm. Outer lens 1710 can be formed as part of a housing for the lens assembly 1700. For example, outer lens 1710 can be integrally formed as part of a sterile disposable sheath (190 in FIG. 10) for use in an endoscopic imaging device. Alternatively, in the videoscopes described above, lens 1710 can be formed as an optically clear window in the optical housing 1310 (FIGS. 13–15).

Distal lens 1720 is a convex/concave lens that can be formed from SFL56 type optical glass having a thickness of 0.53 mm. The convex surface of distal lens 1720 has a radius of curvature of 1.3 mm and the concave surface of distal lens 1720 has a radius of curvature of 2.378 mm. When used in conjunction with outer lens 1710, distal lens 1720 can be separated from outer lens 1710 by a space of 0.3 mm.

Lens 1730 is a doublet lens including lenses 1732 and 1734 that are formed from two different types of glasses. Lens 1732 is formed from SK18A type optical glass having a is, thickness of 0.919 mm. The concave surface of lens 1732 has a radius of curvature of 0.948 mm and the convex surface of lens 1732 has a radius of curvature 1.052 mm. Lens 1734 is formed from SFL56 type optical glass having a thickness of 0.657 mm. The concave surface of lens 1734 has a radius of curvature of 1.052 mm (i.e., the same as the convex surface of lens 1732), and the convex surface of lens 1734 has a radius of curvature of 1.7162 mm.

Lenses 1732 and 1734 are cemented together using an optical cement (e.g., NORLAND 61), and doublet lens 1730 is separated from distal lens 1720 by a distance of 0.533 mm. As shown in FIG. 17, the distance between the distal lens 1720 and the aperture stop 1725 (the plane on which the light rays converge) is 0.2 mm, and the distance between the aperture stop. 1725 and the doublet lens 1730 is 0.333 mm.

Proximal lens 1740 is a bi-convex lens that is formed from SK18A type optical glass having a thickness of 1.500 mm. The radius of curvature of each of the convex surfaces of proximal lens is 6.063 mm. This permits the proximal lens 1740 to be manufactured in a more economical fashion, as similar fabrication procedures can be used for each surface. Furthermore, production of the lens assembly is facilitated and manufacturing defects are reduced because the lens cannot be inserted in the wrong orientation. That is, when both surfaces of a lens have the same shape (i.e., bi-concave or bi-convex) but differ in their radius of curvature, it is difficult to distinguish one surface of the lens from the other. Proximal lens 1740 is separated from doublet lens 1730 by a space of 0.1 mm, and is separated from imaging device 1020 by a space of 0.758 mm. Although not shown in FIG. 17, each of the lenses 1720, 1730 and 1740 includes an anti-reflective coating on its outermost surfaces.

It should be appreciated that the lens assembly 1700 described above is exemplary only, as the dimensions of the lenses 1710, 1720, 1730, 1740, the types of optical glass, and the separation between the lenses may be varied. Optical glass types SFL56 and SK18A are available from Schott Glass Technologies, Inc. of Duryea Pa. Optical glasses from other manufacturers can alternatively be used, although other manufacturers will generally have different designations for optical glasses having similar optical characteristics to those described above. In general, the optical characteristics that are most significant are the index of refraction of the glass and the V number (i.e., the ABBE value) of the glass. By way of example, the polycarbonate material used for outer lens 1710 has an index of refraction of 1,585 and a V number of 29.9, SFL56 type optical glass has an index of refraction of 1.785 and a V number of 26.1, and SK18A type optical glass has an index of refraction of 1.639 and a V number of 55.4.

In one embodiment of the present invention, the lens assembly 1700 is used with a CCD 1780 that includes one or more optical surfaces 1750, 1760 that are separated from the pixel array 1770 of the CCD. An example of such a CCD is the GPKS 462 model CCD from Panasonic. These optical surfaces 1750, 1760 may include one or more filters (e.g., an infrared filter, an antialiasing filter, etc). The CCD may also include a plurality of microlenses 1765 that are used to increase the sensitivity of the pixel elements in the pixel array. Such CCDs having microlenses 1765 covering the pixel elements of the pixel array 1770 have become increasingly more popular. However, Applicants' have found that conventional lens systems are not well suited for use with such CCDs. In particular, Applicant's have determined that when the light incident on the outermost surface of a CCD (e.g., 1750) is more than approximately ten degrees from perpendicular, the pixel elements of the CCD can fail to adequately and uniformly image a target. That is, due to the presence of microlenses 1765, the amount of light detected by the pixel elements at the outer edges of the array can be less than that detected by the pixel elements in the center of the array, even when viewing a uniformly lit target. However, the lens assembly 1700 described above is particularly well suited for use with CCDs having such microlenses 1765 covering the pixel array 1770 because the lens assembly focuses light so that it is nearly perpendicular to the outermost surface 1750 of the CCD 1780, even at the outer edges of the CCD (i.e., the lens assembly is telecentric in image space). The lens assembly 1700 depicted in FIG. 17 is not limited to a particular type or manufacturer of CCD because light from the target is focussed by the lens assembly 1700 so that is it nearly perpendicular to the outermost surface of the CCD. Thus, the lens assembly depicted in FIG. 17 can be used with a wide variety of CCDs, including CCDs having microlenses, CCDs having one or more optical surfaces, CCDs having microlenses and one or more optical surfaces, as well as CCDs having none of these features.

As should be appreciated from the foregoing, the dimensions of the lens assembly 1700, when combined with a small CCD, provide a camera head that is uniquely small and light in weight. This permits the camera head to be rotated and pivoted within a confined space. Prior to Applicants' invention, it is believed that no imaging system had ever been developed that includes a lens assembly that was 5 mm or less in diameter and depth and also capable of focusing light from a target so that light emanating from the lens assembly is telecentric in image space.

According to another aspect of the present invention, an imaging system is provided for monitoring an aircraft. The system involves the use of one or more monitoring cameras that are disposed to view areas on the aircraft that it is desired to monitor. For example, each camera can use the technology discussed above with respect to FIGS. 1 and 17 to provide a small camera head with a variety of positioning options. Each camera can take running video of the target area on the aircraft during specified time periods, or can take periodic snap shots. A camera can be disposed to monitor any area on the inside of the plane, including the passenger compartment, the cargo compartment, etc. The camera may be mounted in a stationary location, or may be moveable. A moveable camera can be arranged to sweep a specified area, either continuously, intermittently or on command, or may be controlled by a set of controls to look at any object within its field of view.

In addition to monitoring the inside of an aircraft, the present invention also contemplates the use of one or more cameras to monitor the outside of the aircraft. Such monitoring can occur on a continuous basis, again with running video or periodic snapshots, or only at specified times. The monitoring cameras can be retractable, (e.g., using the technology described above in connection with FIGS. 2–14) such that they can extend outwardly from the body of the aircraft to monitor its outer surface only at specified times. It is contemplated that when retractable, the cameras could be placed into monitoring position during take off and landing, or at other times during a flight that problems are most likely to arise. In addition, the monitoring system can be coupled to the aircraft's fault or error warning system, such that if a particular area of the aircraft is indicated as experiencing a problem, a retractable camera in that area can be automatically deployed to monitor the situation. Alternatively, if non-retractable cameras are employed, they may only be activated during time periods such as those discussed above. The cameras can also be activated manually during certain times, either in addition to, or instead of, the automatic activation.

One of the benefits of employing a monitoring system on the inside of the aircraft is that in the event of a passenger disruption or highjacking incident, a video record can be taken to record the events that transpired on the aircraft. It is contemplated that the aircraft monitoring system can be wired throughout the aircraft and that the storage medium can be placed in the aircraft's black box so that in the event of a crash, the video record can be reviewed.

As discussed below, the aircraft monitoring system of the present invention can be employed with many different types of cameras. When in a retractable mode, the cameras can be housed in a compartment in the aircraft that can have stabilized temperature and pressure conditions to avoid damage to the monitoring equipment.

The technology described with respect to FIGS. 1–17 is particularly advantageous for use in accordance with the present invention for both monitoring the inside and outside of the aircraft. However, it should be appreciated that many other types of camera can be used, some of which are not movable or controllable. When the technology described in FIGS. 1–17 is used, the lens and CCD of the device can be placed on a retractable support that can move these optical components from inside the aircraft to the outside for monitoring the outside of the plane. In addition, this technology provides the ability to point the camera at any desired field of view with the area of the camera using a control mechanism such as that disclosed above. The control mechanism can be positioned any place in the aircraft (e.g., in the cockpit) to enable those on the aircraft to control the one or more cameras to view areas of interest outside and/or inside the plane. In connection with the technology described in FIGS. 1–17, the camera can be digital and can store information on any digital storage medium (e.g., a hard drive, a CD, a floppy disc, etc.) either in the black box or elsewhere on the plane. However, it should be understood that the aircraft monitoring aspect of the present invention is not limited to the use of a digital camera, and that analog video monitoring devices can also be employed.

Another feature of the technology described in FIGS. 2–12 that is advantageous for use in monitoring the outside of the aircraft is that the lens and CCD are stored within a protective sheath (11 in FIG. 1 and 152 in FIG. 10) having a clear viewing window. The protective sheath will protect these video components from rain and the like when placed outside the aircraft.

It is also contemplated that the monitoring system of the present invention can have a wireless communication capability so that the images transmitted thereby can be recorded off of the aircraft (e.g., at some monitoring ground station). Among other advantages, this would a allow a single operator to perform a visual pre-flight inspection of key areas of the aircraft from a remote location.

Figure 18:
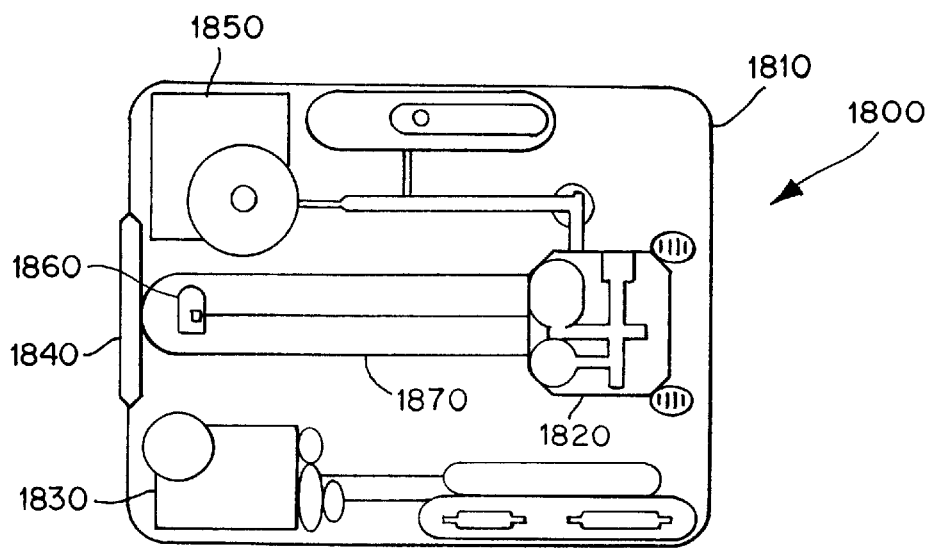
FIG. 18 illustrates an aircraft monitoring system according to a still further aspect of the present invention.

FIG. 18 shows an aircraft monitoring system according to one exemplary embodiment of the present invention. As shown, the monitoring system 1800 includes an electronic camera 1820 such as that described in FIGS. 1–17. The electronic camera is disposed within an environmental pod 1810 that includes one or more environmental systems 1830 for heating, cooling, maintaining humidity, pressure, etc. The environmental systems are used to maintain the internal environmental conditions of the pod within the operating conditions (e.g., temperature, pressure, humidity, etc) of the camera 1820. Of course, when the camera system is disposed within a climate controlled portion of the aircraft, the use of such systems would not be necessary.

The camera system 1800 also includes a positioning system 1850 that permits the camera 1820 to be movably positioned relative to the pod 1810. For example, the camera 1820 can be positioned so that the optical components 1860 (e.g., the lens and CCD) extend outside the pod 1810 when actively monitoring the aircraft, and can be retracted within the pod 1810 during periods of inactivity. A sliding window 1840 that seals the pod 1810 during periods of inactivity can be slid to one side of the pod 1810 to enable this operation. As noted above, a protective sheath 1870 can be used to protect the optical components 1860 from the elements when positioned outside the aircraft.

As should be appreciated from the foregoing, the aspects of the present invention relating to the movable imaging device and lens can be used in a wide variety of other applications. For example, a military surveillance system can include a camera body and a periscoping camera head such as that described with respect to the videoscopes of FIGS. 13–16. The camera head can include only a lens assembly and CCD, with other portions of the imaging system being disposed in the camera body. The military surveillance system can be configured to extend the camera head from the camera body on command to observe a particular area. In harsh environments, the camera body can include environmental systems (e.g., 1830 in FIG. 18) to permit operation in extreme conditions. In addition, the camera body may be camouflaged or shaped like a common object (e.g., a rock) to prevent its detection. Moreover, the system can be configured to relay images from the camera body to a satellite or other remote location. Because the camera head may only include the lens assembly and CCD, the camera head can be so small so as to avoid detection. Moreover, non-reflective coatings can be used on the outermost surface of the lens assembly to further diminish the possibility of detection.

In one illustrative application, the military surveillance system can be dropped into a reconnaissance area by an aircraft. The surveillance system can be configured to automatically extend the camera head from the camera body shortly after landing, or at some other predetermined time.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. An aircraft analysis system for an aircraft, the aircraft having a fault or error warning system capable of detecting and indicating a fault or error with a portion of the aircraft, the aircraft analysis system comprising:

at least one electronic image receiving device that is mounted to a surface of the aircraft to view at least one portion of the aircraft; and means, coupled to the at least one image receiving device and responsive to a fault or error indicated by the aircraft's fault or error warning system, for automatically activating the at least one electronic image receiving device such that when the aircraft's fault or error warning system detects a fault or error, the at least one electronic image receiving device is activated to view a portion of the aircraft where the fault or error is detected.

2. The aircraft analysis system of claim 1, wherein the means for automatically activating includes:

a positioning system, coupled to the at least one image receiving device, that movably positions the at least one image receiving device to view the portion of the aircraft where the fault or error is detected.

3. The aircraft analysis system of claims 2, wherein the positioning system includes means for deploying the at least one image receiving device outside a body of the aircraft.

4. The aircraft analysis system of claim 1, wherein the at least one image receiving device is movably mounted to an exterior surface of the aircraft.

5. The aircraft analysis system of claim 1, further comprising:

a camera compartment that movably mounts the at least one image receiving device to an exterior surface of the aircraft and houses the at least one image receiving device to shield the at least one image receiving device from extremes in environmental conditions.

6. The aircraft analysis system of claim 5, further comprising:

an environmental control system that controls at least one of temperature, pressure, and humidity within the camera compartment.

7. The aircraft analysis system of claim 5, wherein the at least one image receiving device is movably mounted within the camera compartment to view a plurality of different portions of the exterior of the aircraft.

8. The aircraft analysis system of claim 5, wherein the at least one image receiving device can be extended to a position that is outside the camera compartment.

9. The aircraft analysis system of claim 1, wherein the at least one image receiving device is movably mounted to an interior surface of the aircraft.

10. The aircraft analysis system of claim 1, wherein the at least one image receiving device includes a plurality of image receiving devices, each of the plurality of image receiving devices viewing different portions of the aircraft.

11. The aircraft analysis system of claim 1, further comprising:
a camera control unit, coupled to the at least one image receiving device, to form an image of the portion the aircraft viewed by the at least one image receiving device.

12. The aircraft analysis system of claim 11, further comprising:
a display, coupled to the camera control unit, to display the image formed by the camera control unit.

13. The aircraft analysis system of claim 11, further comprising:
a storage medium, coupled to the camera control unit, to automatically store the image formed by the camera control unit.

14. The aircraft analysis system of claim 13, wherein the aircraft includes a structurally rigid compartment within the aircraft that is intended to retain its structural integrity in the event the aircraft crashes, and wherein the storage medium is disposed within the structurally rigid compartment.

15. A method of monitoring an aircraft, the aircraft having a fault or error warning system capable of detecting and indicating a fault or error with a portion of the aircraft, the aircraft further including at least one electronic image receiving device mounted to a surface thereof to view at least one portion of the aircraft, the at least one image receiving device being coupled to the aircraft's fault or error warning system, the method comprising an act of:
(A) in response to an indication of a fault or error detected by the aircraft's fault or error warning system, automatically activating the at least one electronic image receiving device to view a portion of the aircraft where the fault or error is detected.

16. The method of claim 15, further comprising an act of controlling at least one of temperature, pressure, and humidity within a space surrounding the at least one image receiving device.

17. The method of claim 15, further comprising an act of viewing a plurality of different portions of the aircraft where a fault or error is detected.

18. The method of claim 15, wherein the act (A) comprises an act of automatically activating the at least one image receiving device to view a plurality of different portions of the aircraft where the fault or error is detected.

19. The method of claim 15, wherein the aircraft further includes a camera compartment that movably mounts the at least one image receiving device to an exterior surface of the aircraft and houses the at least one image receiving device, the method further comprising an act of extending the at least one image receiving device to a position that is outside the camera compartment.

20. The method of claim 15, further comprising an act of displaying an image viewed by the at least one image receiving device.

21. The method of claim 15, further comprising an act of automatically storing an image viewed by the at least one image receiving device.

22. The method of claim 21, wherein the aircraft includes a structurally rigid compartment that is intended to retain its structural integrity in the event the aircraft crashes, and wherein the act of automatically storing the image viewed by the at least one image receiving device comprises an act of automatically storing the image viewed by the at least one image receiving device to a storage medium within the structurally rigid compartment.

23. The method of claim 15, further comprising an act of transmitting an image viewed by the at least one image receiving device to a location remote from the aircraft.

24. The method of claim 15, further comprising an act of, in addition to automatically activating the at least one image receiving device, manually controlling the at least one image receiving device from a cockpit of the aircraft to view different portions of the aircraft.

25. The method of claim 15, wherein the act (A) comprises an act of adjusting a viewing position of the at least one image receiving device to view the portion of the aircraft where the fault or error is detected.

26. The method of claim 25, wherein the act of adjusting a viewing position of the at least one image receiving device to view the portion of the aircraft where the fault or error is detected comprises an act of deploying the at least one image receiving device outside a body of the aircraft.

27. The method of claim 25, wherein the act of adjusting a viewing position of the at least one image receiving device to view the portion of the aircraft where the fault or error is detected comprises an act of adjusting a viewing position of the at least one image receiving device to view an external portion of the aircraft where the fault or error is detected.

28. The method of claim 25, wherein the act of adjusting a viewing position of the at least one image receiving device to view the portion of the aircraft where the fault or error is detected comprises an act of adjusting a viewing position of the at least one image receiving device to view an internal portion of the aircraft where the fault or error is detected.

29. The method of claim 15, further comprising an act of mounting the at least one image receiving device to the surface of the aircraft to view at least one portion of the aircraft.

30. The method of claim 29, further comprising an act of shielding the at least one image receiving device from extremes in environmental conditions.

31. The method of claim 29, further comprising an act of housing the at least one image receiving device within a camera compartment.

32. The method of claim 31, further comprising an act of controlling at least one of temperature, pressure, and humidity within the camera compartment.

33. The method of claim 29, wherein the act of mounting the at least one image receiving device to a surface of the aircraft comprises an act of movably mounting the at least one image receiving device to an interior surface of the aircraft.

34. The method of claim 29, wherein the act of mounting the at least one image receiving device to a surface of the aircraft comprises an act of movably mounting the at least one image receiving device to an exterior surface of the aircraft.

35. The method of claim 29, wherein the act of mounting the at least one image receiving device to a surface of the aircraft comprises an act of mounting a plurality of image receiving devices to surfaces of the aircraft.

36. A method of monitoring an aircraft, the aircraft having a fault or error warning system capable of detecting and indicating a fault or error with a portion of the aircraft, the aircraft further including at least one electronic image receiving device mounted to a surface thereof to view at least one portion of the aircraft, the method comprising an act of:

(A) coupling the at least one image receiving device to the aircraft's fault or error warning system so that, in response to an indication of a fault or error detected by the aircraft's fault or error warning system, the at least one image receiving device can be automatically activated to view a portion of the aircraft where the fault or error is detected.

37. The method of claim 36, further comprising an act of adjusting a viewing position of the at least one image receiving device to view the portion of the aircraft where the fault or error is detected.

38. The method of claim 37, wherein the act of adjusting a viewing position of the at least one image receiving device to view the portion of the aircraft where the fault or error is detected comprises an act of adjusting a viewing position of the at least one image receiving device to view an external portion of the aircraft where the fault or error is detected.

39. The method of claim 37, wherein the act of adjusting a viewing position of the at least one image receiving device to view the portion of the aircraft where the fault or error is detected comprises an act of adjusting a viewing position of the at least one image receiving device to view an internal portion of the aircraft where the fault or error is detected.

40. The method of claim 36, further comprising an act of mounting the at least one image receiving device to the surface of the aircraft to view at least one portion of the aircraft.

41. The method of claim 36, further comprising an act of displaying an image viewed by the at least one image receiving device.

42. The method of claim 36, further comprising an act of automatically storing an image viewed by the at least one image receiving device.

43. The method of claim 42, wherein the aircraft includes a structurally rigid compartment that is intended to retain its structural integrity in the event the aircraft crashes, and wherein the act of automatically storing the image viewed by the at least one image receiving device comprises an act of automatically storing the image viewed by the at least one image receiving device to a storage medium within the structurally rigid compartment.

44. The method of claim 36, further comprising an act of transmitting an image viewed by the at least one image receiving device to a location remote from the aircraft.

45. The method of claim 36, further comprising an act of automatically activating the at least one image receiving device to view a portion of the aircraft where the fault or error is detected.

46. The method of claim 45, wherein the act of automatically activating the at least one image receiving device to view a portion of the aircraft where the fault or error is detected comprises an act of automatically activating the at least one image receiving device to view a plurality of different portions of the aircraft where the fault or error is detected.

47. The method of claim 45, further comprising an act of, in addition to automatically activating the at least one image receiving device, manually controlling the at least one image receiving device from a cockpit of the aircraft to view different portions of the aircraft.

48. An aircraft monitoring system for an aircraft, the aircraft having a fault or error warning system capable of detecting and indicating a fault or error with a portion of the aircraft, the aircraft monitoring system comprising:

at least one electronic image receiving device that is mounted to a surface of the aircraft to view at least one portion of the aircraft; and a controller, coupled to the at least one image receiving device and responsive to a fault or error indicated by the aircraft's fault or error warning system, automatically activating the at least one image receiving device such that when the aircraft's fault or error warning system detects a fault or error, the at least one electronic image receiving device is activated to view a portion of the aircraft where the fault or error is detected.

49. The aircraft monitoring system of claim 48, wherein the controller comprises a positioning system, coupled to the at least one image receiving device, that movably positions the at least one image receiving device to view the portion of the aircraft where the fault or error is detected.

50. The aircraft monitoring system of claims 40, wherein the positioning system includes an actuator coupled to the at least one image receiving device, the actuator adapted to deploy the at least one image receiving device outside a body of the aircraft.

51. The aircraft monitoring system of claim 48, wherein the at least one image receiving device is movably mounted to an exterior surface of the aircraft.

52. The aircraft monitoring system of claim 48, further comprising a camera compartment that movably mounts the at least one image receiving device to an exterior surface of the aircraft and houses the at least one image receiving device.

53. The aircraft monitoring system of claim 52, further comprising an environmental control system that controls at least one of temperature, pressure, and humidity within the camera compartment.

54. The aircraft monitoring system of claim 52, wherein the at least one image receiving device is movably mounted within the camera compartment to view a plurality of different portions of the exterior of the aircraft.

55. The aircraft monitoring system of claim 52, wherein the at least one image receiving device can be extended to a position that is outside the camera compartment.

56. The aircraft monitoring system of claim 48, wherein the at least one image receiving device is movably mounted to an interior surface of the aircraft.

57. The aircraft monitoring system of claim 48, wherein the at least one image receiving device includes a plurality of image receiving devices, each of the plurality of image receiving devices viewing different portions of the aircraft.

58. The aircraft monitoring system of claim 48, wherein the controller is adapted to form an image of the portion the aircraft viewed by the at least one image receiving device.

59. The aircraft monitoring system of claim 58, further comprising a display, coupled to the controller, to display the image formed by the controller.

60. The aircraft monitoring system of claim 59, further comprising a storage medium, coupled to the controller, to automatically store the image formed by the controller.

61. The aircraft monitoring system of claim 60, wherein the aircraft includes a structurally rigid compartment within the aircraft that is intended to retain its structural integrity in the event the aircraft crashes, and wherein the storage medium is disposed within the structurally rigid compartment.

62. The aircraft monitoring system of claim 48, further comprising controls, mounted within a cockpit of the aircraft and coupled to the controller, the controls being adapted to manually control the at least one image receiving device.

63. An aircraft monitoring system for an aircraft, the aircraft having a fault or error warning system capable of detecting and indicating a fault or error with a portion of the aircraft, the aircraft monitoring system comprising:

at least one electronic image receiving device that is mounted to a surface of the aircraft to view at least one portion of the aircraft; and a processor, coupled to the at least one image receiving device and responsive to a fault or error indicated by the aircraft's fault or error warning system, automatically activating the at least one image receiving device such that when the aircraft's fault or error warning system detects a fault or error, the at least one electronic image receiving device is activated to view a portion of the aircraft where the fault or error is detected.

64. The aircraft monitoring system of claim 63, wherein the controller comprises a positioning system, coupled to the at least one image receiving device, that movably positions the at least one image receiving device to view the portion of the aircraft where the fault or error is detected.

65. The aircraft monitoring system of claim 63, wherein the at least one image receiving device is movably mounted to an exterior surface of the aircraft.

66. The aircraft monitoring system of claim 63, wherein the at least one image receiving device is movably mounted to an interior surface of the aircraft.

67. The aircraft monitoring system of claim 63, wherein the processor is adapted to form an image of the portion the aircraft viewed by the at least one image receiving device.

68. The aircraft monitoring system of claim 63, further comprising a display, coupled to the processor, to display the image formed by the processor.

69. The aircraft monitoring system of claim 63, further comprising controls, mounted within a cockpit of the aircraft and coupled to the processor, the controls being adapted to manually control the at least one image receiving device.

* * * * *

UNITED STATES PATENT AND TRADEMARK OFFICE
CERTIFICATE OF CORRECTION

PATENT NO.    : 6,577,339 B1
DATED         : June 10, 2003
INVENTOR(S)   : Robert Lee Thompson It is certified that error appears in the above-identified patent and that said Letters Patent is hereby corrected as shown below:

Title page,
Item [75], Inventors, "Robert Lee Thompson, Rogers, AR
                     Dennis C. Leiner, Greenfield, NH"
should read -- Robert Lee Thompson, Rogers, AR --

Signed and Sealed this

Ninth Day of December, 2003

JAMES E. ROGAN
*Director of the United States Patent and Trademark Office*